United States Patent
Seo et al.

(10) Patent No.: US 10,162,402 B2
(45) Date of Patent: Dec. 25, 2018

(54) SERIAL COMMUNICATION METHOD

(71) Applicant: SAMSUNG ELECTRONICS CO., LTD., Suwon-si, Gyeonggi-do (KR)

(72) Inventors: Sung-Ho Seo, Seoul (KR); Soon-Bok Jang, Seoul (KR); Sung-Ha Kim, Yongin-si (KR); Sang-Hoon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 260 days.

(21) Appl. No.: 14/714,570

(22) Filed: May 18, 2015

(65) Prior Publication Data

US 2015/0331474 A1  Nov. 19, 2015

(30) Foreign Application Priority Data

May 19, 2014 (KR) .................. 10-2014-0059963

(51) Int. Cl.
   *G06F 1/32* (2006.01)

(52) U.S. Cl.
   CPC .......... *G06F 1/3278* (2013.01); *G06F 1/3206* (2013.01); *Y02D 10/157* (2018.01)

(58) Field of Classification Search
   None
   See application file for complete search history.

(56) References Cited

U.S. PATENT DOCUMENTS

| | | | |
|---|---|---|---|
| 6,052,565 A * | 4/2000 | Ishikura | H04W 24/00 455/423 |
| 8,446,903 B1 | 5/2013 | Ranganathan et al. | |
| 8,532,004 B2 | 9/2013 | Hunt et al. | |
| 2008/0280656 A1 * | 11/2008 | Gonikberg | H04W 52/0283 455/572 |
| 2009/0119527 A1 | 5/2009 | Kim | |
| 2010/0081406 A1 | 4/2010 | Tan et al. | |

(Continued)

FOREIGN PATENT DOCUMENTS

WO   WO2013095432 A1   6/2013

OTHER PUBLICATIONS

Chung, Yuping, "UFS PHY & UNIPRO," Taiwan Mobile Memory Workshop, Oct. 12, 2011.

*Primary Examiner* — Kim Huynh
*Assistant Examiner* — Kevin M Stewart
(74) *Attorney, Agent, or Firm* — Volentine, Whitt, & Francos, PLLC

(57) ABSTRACT

A serial communication method for a layered communication architecture includes a first layer, a second layer that is higher than the first layer, and a third layer that is higher than the second layer. The serial communication method includes transferring a first signal to the second layer based on a signal received through a communication line, the transferring performed by the first layer. The serial communication method further includes informing the third layer of reception of the first signal, the informing performed by the second layer; responding to the second layer based on whether there is a task to be performed, the responding performed by the third layer; transferring a second signal to the first layer based on a response from the third layer the transferring performed by the second layer; and entering a power saving state according to the second signal, the entering performed by the first layer.

19 Claims, 13 Drawing Sheets

(56) References Cited

U.S. PATENT DOCUMENTS

| | | | |
|---|---|---|---|
| 2010/0111081 A1* | 5/2010 | Diab | H04L 12/12 |
| | | | 370/389 |
| 2010/0330927 A1* | 12/2010 | Cherukuri | G06F 1/3287 |
| | | | 455/68 |
| 2011/0016417 A1 | 1/2011 | Shiplacoff et al. | |
| 2011/0138096 A1* | 6/2011 | Radulescu | G06F 13/385 |
| | | | 710/305 |
| 2011/0164624 A1 | 7/2011 | Kelleher et al. | |
| 2011/0296076 A1* | 12/2011 | Hu | G06F 13/385 |
| | | | 710/316 |
| 2012/0159204 A1 | 6/2012 | Tang et al. | |
| 2013/0031388 A1 | 1/2013 | Sakarda | |
| 2013/0097444 A1 | 4/2013 | Hoagland et al. | |
| 2013/0166864 A1 | 6/2013 | Yerushalmi et al. | |
| 2013/0268782 A1 | 10/2013 | Tam et al. | |
| 2013/0268783 A1 | 10/2013 | Diab et al. | |
| 2014/0086363 A1* | 3/2014 | Yang | H03K 9/08 |
| | | | 375/340 |
| 2014/0143637 A1* | 5/2014 | Cohen | H03M 13/1108 |
| | | | 714/773 |
| 2014/0244904 A1* | 8/2014 | Kondo | G06F 13/1684 |
| | | | 711/103 |
| 2015/0160716 A1* | 6/2015 | Hiraoka | G06F 1/3253 |
| | | | 713/320 |

\* cited by examiner

SERIAL COMMUNICATION METHOD

CROSS-REFERENCE TO RELATED APPLICATION

A claim for priority under 35 U.S.C. § 119 is made to Korean Patent Application No. 10-2014-0059963, filed May 19, 2014, in the Korean Intellectual Property Office, the entire contents of which are hereby incorporated by reference.

BACKGROUND

The inventive concepts relate to a serial communication method, and more particularly, to a serial communication method for a layered communication architecture.

Electronic devices, such as personal computers, smart phones, or personal digital assistants (PDAs), may include a plurality of digital devices, such as processors, memories, communication controllers, and display controllers, among other devices. Such digital devices may include a connection unit (hereinafter, referred to as an "interface") that enables signals, such as data or commands, to be exchanged with other digital devices.

With the development of semiconductor technologies, the trend has been to design digital devices with serial communication interfaces instead of parallel communication interfaces. In view of the desire to limit the number of ports of digital devices, increase the amount of transmitted and/or received data, and reduce power consumption, the demand for serial communication for high-speed data transmission and reception has gradually increased. Serial communication may have a layered communication architecture as defined in the open systems interconnection (OSI) model (ISO/IEC 7498-1), for example. Serial communication may also be switched between high-speed and low-speed modes to reduce power consumption during data communication. Apparatuses using serial communication may also be designed to enter a power saving state when no data communication is performed.

SUMMARY

Embodiments of the inventive concept provide a serial communication method capable of providing a power saving state and rapidly escaping from the power saving state.

Example embodiments of the inventive concept provide a serial communication method for a layered communication architecture including a first layer, a second layer that is higher than the first layer, and a third layer that is higher than the second layer, the serial communication method including transferring a first signal to the second layer based on a signal received through a communication line, the transferring of the first signal performed by the first layer. The method further includes informing the third layer of reception of the first signal, the informing performed by second layer; responding to the second layer based on whether there is a task to be performed, the responding performed by the third layer; transferring a second signal to the first layer based on a response from the third layer, the transferring the second signal performed by the second layer; and entering a first power saving state according to the second signal, the entering the first power saving state performed by the first layer.

In an embodiment of the inventive concept, the first signal may include a first symbol, and the serial communication method may further include transferring the first symbol to the first layer before the transferring of the second signal, the transferring the second signal performed by the second layer; and transferring a signal corresponding to the first symbol through the communication line, the transferring the signal performed by the first layer.

In an embodiment of the inventive concept, the serial communication method may further include when there is no task to be performed, entering a second power saving state after responding to the second layer, the entering the second power saving state performed by the third layer; and entering a third power saving state after transferring of the second signal to the first layer, the entering the third power saving state performed by the second layer.

In an embodiment of the inventive concept, the serial communication method may further include detecting whether the communication line transitions from a first logic level to a second logic level in the first power saving state, the detecting performed by the first layer; when a transition is detected, escaping from the first power saving state and transferring a third signal to the second layer and the third layer, the transferring the third signal performed by the first layer; and entering communicable states in response to the third signal, the entering the communicable states performed by the second and third layers respectively.

In an embodiment of the inventive concept, the first layer may include a physical layer, the second layer may include a data link layer, and the third layer may include an application layer.

In an embodiment of the inventive concept, the serial communication method may further include determining whether there is a task to be performed by determining whether there is data to be transmitted, the determining performed by the third layer.

In an embodiment of the inventive concept, the serial communication method may be used in a universal flash storage (UFS) interface, the first layer may include a mobile industry processor interface (MIPI) M-PHY layer, and the second layer may include an MIPI UniPro layer.

Example embodiments of the inventive concept provide a serial communication method used in a universal flash storage (UFS) interface between a host and a device, the serial communication method including receiving at a mobile industry processor interface (MIPI) M-PHY layer of the device a signal corresponding to a first symbol through a communication line and transferring the first symbol to an MIPI UniPro layer of the device The method may further include informing an application layer of the device of reception of the first symbol, the informing performed by the MIPI UniPro layer; responding to the MIPI UniPro layer based on whether there is a task to be performed, the responding performed by the application layer; requesting the MIPI M-PHY layer to enter a first power saving state based on a response from the application layer, the requesting performed by the MIPI UniPro layer; and entering the first power saving state in response to the request for entry to the first power saving state, the entering performed by the MIPI M-PHY layer.

In an embodiment of the inventive concept, the serial communication method may further include transferring the first symbol to the MIPI M-PHY layer before requesting the MIPI M-PHY layer to enter the first power saving state, the transferring the first symbol performed by the MIPI UniPro layer; and transferring the signal corresponding to the first symbol to the host through the communication line, the transferring the signal performed by the MIPI M-PHY,.

In an embodiment of the inventive concept, the serial communication method may further include when there is no task to be performed, entering a second power saving state after responding to the MIPI UniPro layer, the entering the second power saving state performed by the application layer; and entering a third power saving state after requesting the MIPI M-PHY layer to enter the first power saving state, the entering the third power saving state performed by the MIPI UniPro layer.

In an embodiment of the inventive concept, the serial communication method may further include detecting whether the communication line transitions from a DIF-N level to a DIF-P level, the detecting performed by the MIPI M-PHY layer; when a transition is detected, escaping from the first power saving state and transferring a wakeup signal to the MIPI UniPro layer and the application layer, the transferring the wake-up signal performed by the MIPI M-PHY layer; and respectively entering communicable states in response to the wakeup signal, the entering the communicable states performed by the MIPI UniPro layer and the application layer.

In an embodiment of the inventive concept, the device may include a power management unit configured to control power of the UFS interface, and the wakeup signal may be transferred to the MIPI UniPro layer and the application layer through the power management unit.

In an embodiment of the inventive concept, the first symbol may include two consecutive MK2 data units.

In an embodiment of the inventive concept, the first power saving state may include a deep-stall state and a deep-sleep state, and the deep-stall state and the deep-sleep state respectively transition from a high speed (HS)-burst state and a pulse width modulation (PWM)-burst state, or the deep-stall state and the deep-sleep state respectively transition to the HS-burst state and the PWM-burst state.

In an embodiment of the inventive concept, the device may include a phase locked loop (PLL) used by the MIPI M-PHY layer and one or more ports connected to the communication line, and the serial communication method may further include turning the PLL off and/or masking at least one of the ports in the first power saving state.

Example embodiments of the inventive concept provide a serial communication method between first and second devices, which may include entering a communication mode to serially transmit and receive data between the first and second devices; receiving a first symbol at the second device from the first device; determining if data is available for transmission at the second device, responsive to receipt of the first symbol; transmitting the first symbol from the second device to the first device upon determination that data is not available for transmission at the second device; entering a power saving state at the second device responsive to the received first symbol, after the transmitting the first symbol to the first device; determining at the second device whether a communication line between the first and second devices transitions from a first logic level to a second logic level; and escaping from the power saving state at the second device upon determination of the transition.

In an embodiment of the inventive concept, the serial communication method may further include transmitting data from the second device to the first device upon determination that data is available for transmission at the second device.

In an embodiment of the inventive concept, the first device may be a host device, and the second device may be a storage device.

In an embodiment of the inventive concept, the communication line may be a differential communication line, and the first logic level may be a DIF-N logic level and the second logic level may be a DIF-P logic level.

In an embodiment of the inventive concept, the first and second devices may respectively include first and second universal flash storage (UFS) interfaces connected to the communication line.

BRIEF DESCRIPTION OF THE DRAWINGS

The embodiments of the inventive concept will be more clearly understood from the following detailed description taken in conjunction with the accompanying figures.

DETAILED DESCRIPTION

Hereinafter, embodiments of the inventive concept are provided so that this disclosure will be thorough and complete, and will fully convey the inventive concept to those of ordinary skill in the art. As used herein, the term "and/or" includes any and all combinations of one or more of the associated listed items.

A layered communication architecture (hereinafter, referred to as a protocol stack) used in serial communication may include a plurality of layers including a physical layer as the lowest layer. Examples of the physical layer may include an M-PHY, a Unified Protocol (UniPro), a PCI expressor, an ultra-speed universal serial bus (an ultra-speed USB), a HyperTransport, a RapidIO, an InfiniBand, a serial ATA, and the like. In particular, the M-PHY and the UniPro have a low power consumption characteristic that supports use thereof in a mobile electronic device. Both of the M-PHY and the UniPro are defined by the mobile industry processor interface (MIPI) alliance. In addition, the M-PHY (hereinafter, also referred to as an "MIPI M-PHY") and the UniPro are adopted in a universal flash storage (UFS) interface defined in the Joint Electron Device Engineering Council (JEDEC).

With the increasing demand for mobile electronic devices, a layered communication architecture used in serial communication may provide a power saving state so as to reduce power consumption in serial communication. For example, layers included in the layered communication architecture may have relevant power saving states. In a power saving state, an interface may cut off power supplied to elements that are not used, may mask a communication line connected to another interface, or may apply a specific voltage to the communication line.

Figure 1:
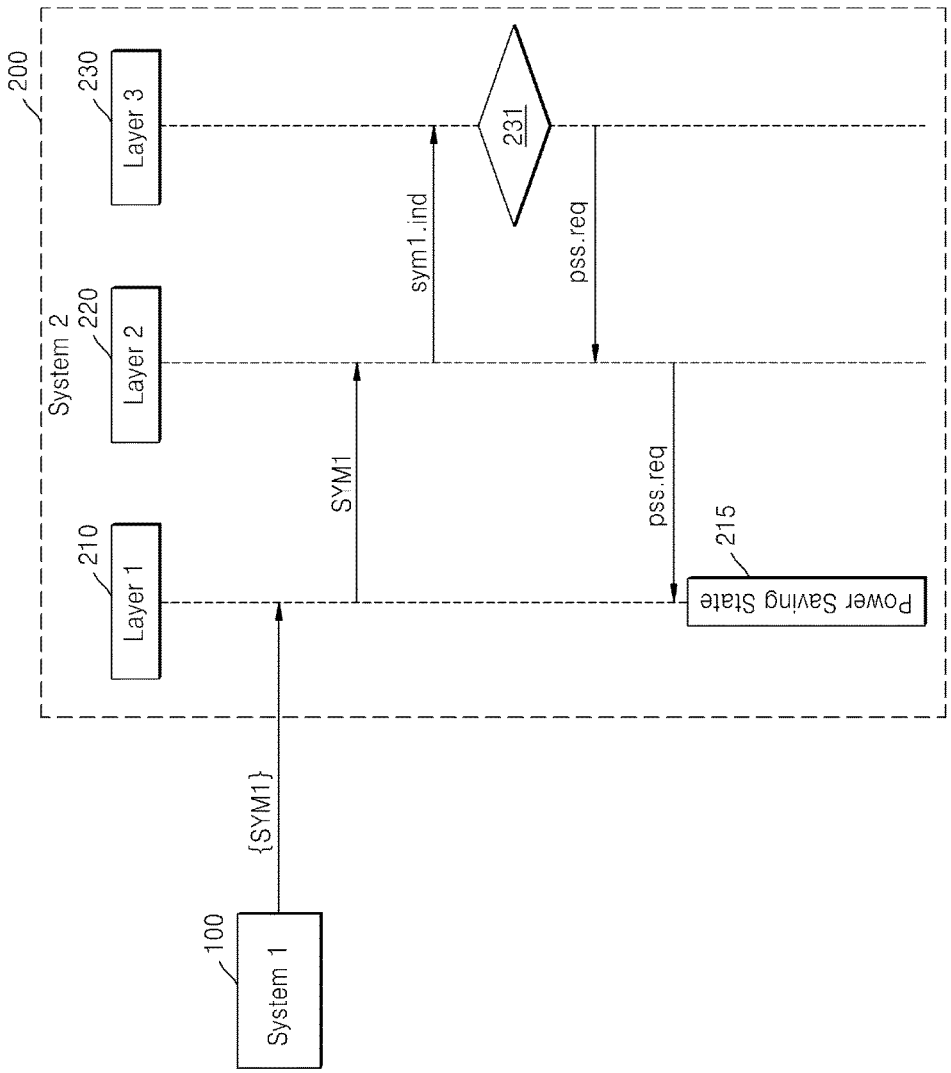
FIG. 1 is a diagram illustrating the timing of an operation of entering a power saving state in a layered communication architecture, according to an embodiment of the inventive concept.
Figure 2:
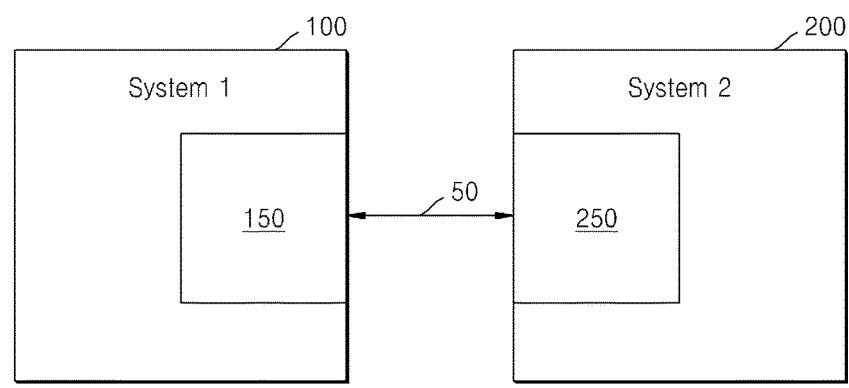
FIG. 2 is a block diagram illustrating systems that perform serial communication.

FIG. 1 is a diagram illustrating the timing of an operation of entering a power saving state in a layered communication architecture, according to an embodiment of the inventive concept. FIG. 2 is a block diagram illustrating systems that perform serial communication.

Referring to FIG. 2, a first system (System 1) 100 and a second system (System 2) 200 may respectively include a first interface 150 and a second interface 250 which perform serial communication. The first and second interfaces 150 and 250 may be connected to each other through a communication line 50. The communication line 50 may be a line capable of transferring one or more electric signals or optical signals. The first system 100 and the second system 200 (or the first interface 150 and the second interface 250) may transmit and receive data between each other through the communication line 50. In the accompanying drawings, in some cases the communication line 50 may be omitted to simplify the drawings, and in others the communication line 50 may be the communication line 50 of FIG. 2.

According to the present embodiment of the inventive concept, the first system 100 and the second system 200 may perform serial communication with each other using a layered communication architecture including three layers. Referring to FIG. 1, the second system 200 may perform serial communication with the first system 100 through a layered communication architecture including a first layer (Layer 1) 210, a second layer (Layer 2) 220, and a third layer (Layer 3) 230. Although not illustrated in FIG. 1, the first system 100 may also include a layered communication architecture including three layers corresponding to the first layer 210, the second layer 220, and the third layer 230, respectively. The layers corresponding to the first system 100 and the second system 200 may be implemented in the first interface 150 and the second interface 250, respectively. For example, the first layer 210, the second layer 220, and the third layer 230 may be respectively implemented using hardware logic elements in the second interface 250, or may be implemented using software functions to be executed by a processor included in the second interface 250. For clarity, the first interface 150 and the second interface 250 illustrated in FIG. 2 are omitted in FIGS. 1 and FIGS. 3 to FIG. 6 which illustrate the first system 100 and second system 200.

The first layer 210 may be a lower layer of the second layer 220, and the second layer 220 may be a lower layer of the third layer 230. The first layer 210 may transfer a data unit to the second layer 220 based on a signal received through the communication line 50. The third layer 230 may interoperate along with application software (for example, software used by a user of the second system 200) executed in the second system 200. The second layer 220 may transfer a data unit or a signal between the first layer 210 and the third layer 230. When the first layer 210, the second layer 220, and the third layer 230 are respectively implemented using hardware elements, the data unit or the signal transferred among the first layer 210, the second layer 220, and the third layer 230 may be signals transferred among the layers through conductive lines. When the first layer 210, the second layer 220, and the third layer 230 are respectively implemented using independent functions of software executed by a processor, the data unit or the signal transferred among the first layer 210, the second layer 220, and the third layer 230 may be data transferred among the layers through parameter values.

According to the present embodiment of the inventive concept, when the first system 100 has no task to be performed, for example when there is no data to be transmitted to the second system 200, the first system 100 may transfer information to the second system 200 so as to reduce power consumption during serial communication. For example, the first system 100 may transmit a signal {SYM1} corresponding to a first symbol SYM1 to the second system 200 through the communication line 50 as illustrated in FIG. 1. The first symbol SYM1 may match a data unit complying with a protocol used by a second layer (not illustrated) of the first system 100 and the second layer 220 of the second system 200. The signal {SYM1} may be a signal obtained by encapsulating the first symbol SYM1 (for example, by adding a header or a footer to the first system SYM1) so that a first layer (not illustrated) of the first system 100 may transfer the first symbol SYM1 through the communication line 50.

The second layer 220 of the second system 200 may receive the first symbol SYM1 from the first layer 210. The second layer 220 may inform the third layer 230 of reception of the first symbol SYM1. For example, as illustrated in FIG. 1, after the second layer 220 receives the first symbol SYM1 from the first layer 210, the second layer 220 may inform the third layer 230 of the reception of the first symbol SYM1 from the first system 100 (through the first layer 210) by transmitting a "sym1.ind" signal to the third layer 230.

According to the present embodiment of the inventive concept, the third layer 230 may recognize that the first symbol SYM1 is received from the first system 100 (through the first layer 210 and the second layer 220), through the second layer 220. For example, as illustrated in FIG. 1, the third layer 230 may recognize that the first symbol SYM1 is received by receiving the "sym1.ind" signal from the second layer 220. Thereafter, the third layer 230 may perform an operation 231 of determining whether there is a task to be performed using serial communication. For example, the third layer 230 may manage a queue storing data (or messages) to be transmitted to the first system 100 by application software and perform the operation of determining whether there is data stored in the queue.

When the third layer 230 of the second system 200 determines that there is no task to be performed using serial communication in the operation 231, the third layer 230 may send a power saving state entry request to the second layer 220. For example, as illustrated in FIG. 1, when there is no data stored in the queue, the third layer 230 may send the power saving state entry request to the second layer 220 by transmitting a "pss.req" signal to the second layer 220.

The second layer 220 of the second system 200 may send the power saving state entry request to the first layer 210 in response to the "pss.req" signal received from the third layer 230. Although the signal that the second layer 220 receives from the third layer 230 is illustrated as being identical to the signal the second layer 220 transfers to the first layer 210 in FIG. 1, this is merely exemplary. For example, after the second layer 220 receives the "pss.req" signal, the second layer 220 may generate a signal by converting the "pss.req" signal into a form suitable to be received by the first layer 210 and transfer the generated signal to the first layer 210.

The first layer 210 of the second system 200 may enter a power saving state 215 corresponding to the first layer 210 based on the "pss.req" signal received from the second layer 220. The power saving state which the first layer 210 may enter may include a plurality of power saving states. The plurality of power saving states may be different from each other depending on a state before entry to a power saving state or a power saving level. For example, the power saving state 215 of the first layer 210 illustrated in FIG. 1 may be a state of cutting off power supplied to at least one component included in the interface 250 of the second system 200, for example cutting off power to a phase locked loop (PLL). Alternatively, the power saving state 215 of the first layer 210 may be a state of masking a port of the second system 200 connected to the communication line 50. Operations to be controlled in the power saving state 215 of the first layer 210 in the interface 250 may be determined depending on an overhead necessary at a time of escaping (or waking up) from the power saving state 215. For example, the power saving state 215 of the first layer 210 may correspond to an idle state in which data is immediately received when the first system 100 transmits the data. Reception of specific data from the first system 100 or an electric change in the communication line 50 may be necessary to escape from the power saving state 215.

Figure 3:
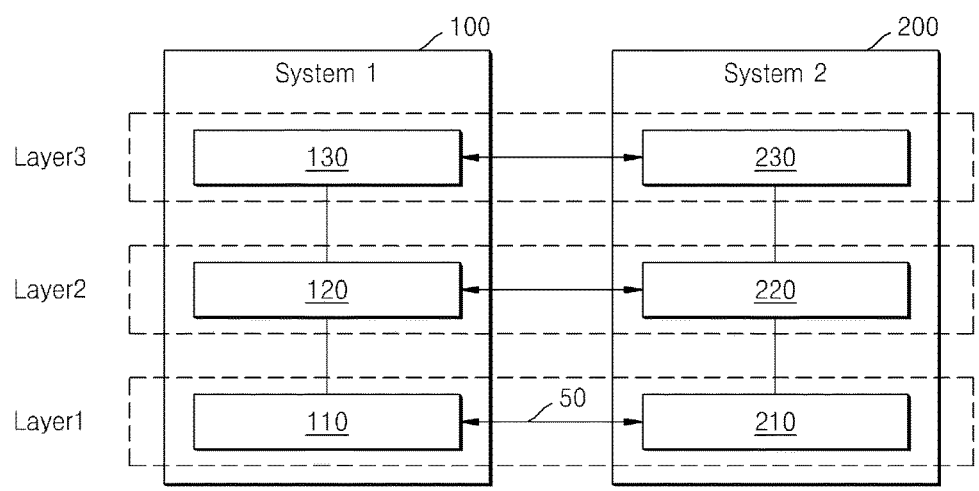
FIG. 3 is a block diagram illustrating a layered communication architecture according to an open systems interconnection (OSI) model.

FIG. 3 is a block diagram illustrating a layered communication architecture according to the open systems interconnection (OSI) model. According to the OSI model, in the layered communication architecture, a layer may add a header or footer to a data unit that is transferred from a higher layer and may transfer the data unit to a lower layer. In addition, the layer may transfer a data unit from which a header or a footer is removed to the higher layer based on a data unit (or a signal) transferred from a lower layer. For example, a physical layer may add a header or footer to a data unit that is transferred from a higher layer of the physical layer, that is, a data link layer, and transfer the data unit to a counterpart system through the communication line 50. In addition, the physical layer may transfer a data unit from which a header or a footer is removed to the data link layer based on a signal received through the communication line 50.

Referring to FIG. 3, the first system 100 (or the interface 150 of the first system 100 in FIG. 2) may perform serial communication through a first layer 110 (Layer 1), a second layer 120 (Layer 2), and a third layer (Layer 3) 130. In addition, the second system 200 (or the interface 250 of the second system 200 in FIG. 2) may perform serial communication through the first layer 210, the second layer 220, and the third layer 230. The layers corresponding to each other in the first system 100 and the second system 200 may share the same protocol and therefore, data units transmitted and received in the first system 100 and the second system 200 may be identical to each other. That is, the first, second and third layers 110, 120 and 130 of the first system 100 may share (or obey) "Protocol 1", "Protocol 2", and "Protocol 3" with the first, second and third layers 210, 220 and 230 of the second system 200, respectively. For example, the second layers 120 and 220 of the first and second systems 100 and 200 may share "Protocol 2" with each other as illustrated in FIG. 3. Accordingly, data may be transmitted and received between the second layers 120 and 220 in a symbol unit that is defined as a data unit as illustrated in FIG. 1.

On the other hand, although the first system 100 and the second system 200 are illustrated as performing serial communication through the three layers, this is merely exemplary. In order words, additional layers may be used, for example, a layer disposed on the third layer 130 of the first system 100 and a layer disposed on the third layer 230 of the second system 200. According to another embodiment, the second layer 120 of the first system 100 and the second layer 220 of the second system 200 may each include a plurality of layers.

Figure 4:
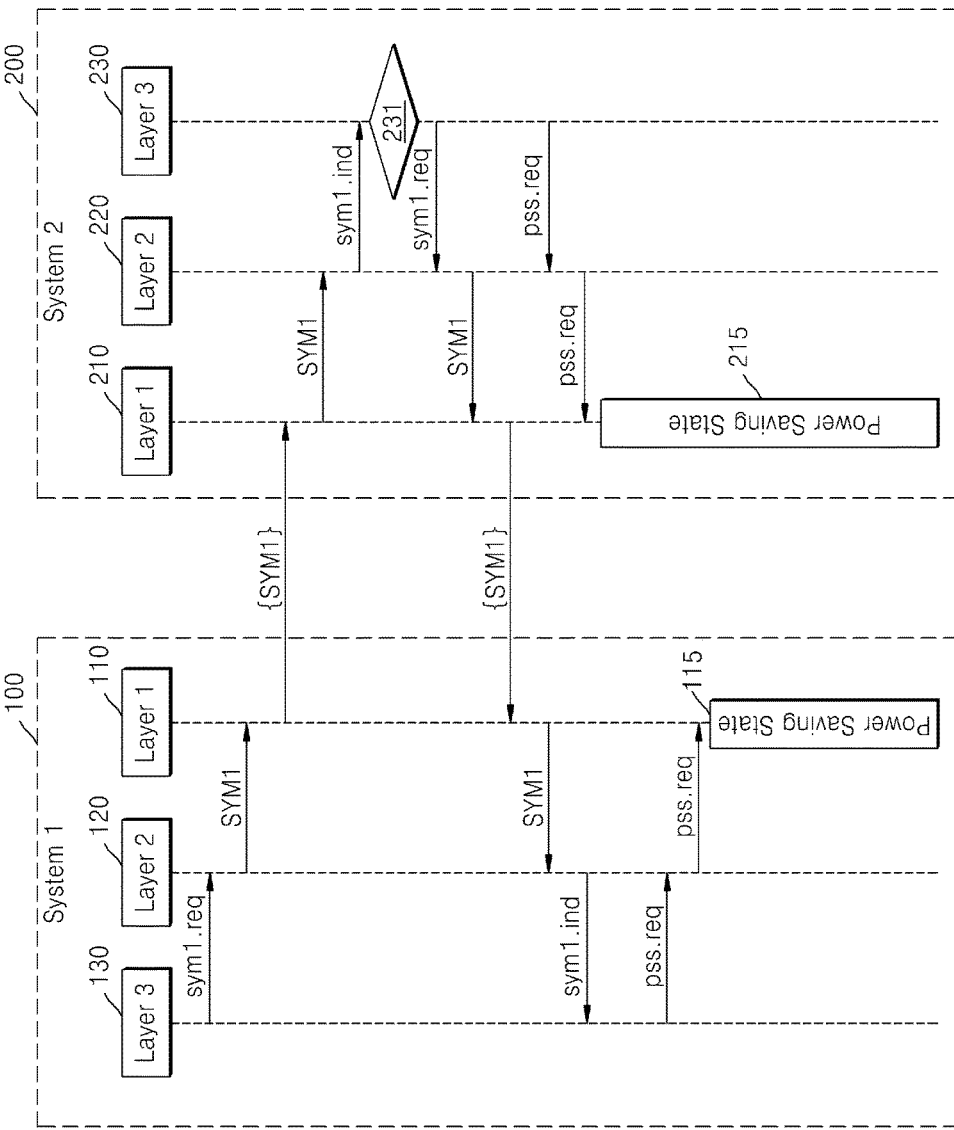
FIG. 4 is a diagram illustrating an operation of the first system shown in FIG. 1 entering a power saving mode, according to an embodiment of the inventive concept.

FIG. 4 is a diagram illustrating an operation of the first system 100 shown in FIG. 1 entering a power saving mode, according to an embodiment of the inventive concept. As described with reference to FIG. 1, the first system 100 may transfer information to the second system 200 so as to reduce power consumption during serial communication. For example, when the first system 100 transmits no data to the second system 200, application software that is being executed in the first system 100 may instruct the third layer 130 (or the first interface 150 of FIG. 2 in which the third layer 130 is implemented) to perform power saving.

The third layer 130 implemented in the interface 150 of the first system 100 may request the second system 200 to transmit the first symbol SYM1 in response to the instruction from the application software. For example, as illustrated in FIG. 4, the third layer 130 of the first system 100 may request the second layer 120 to transmit the first symbol SYM1 by transferring a "sym1.req" signal to the second layer 120. Thereafter, the second layer 120 transmits the first symbol SYM1 to the first layer 110. The first layer 110 of the first system 100 may transmit the signal {SYM1} obtained by encapsulating the first symbol SYM1 to the second system 200 through the communication line 50.

The first layer 210 of the second system 200 may receive the signal {SYM1} obtained from the first symbol SYM1 from the first system 100 through the communication line 50. The second layer 220 of the second system 200 may receive the first symbol SYM1 from the first layer 210 and inform the third layer 230 of reception of the first symbol SYM1. As illustrated in FIG. 3, the third layer 230 of the second system 200 may recognize that the first symbol SYM1 is received from the first system 100 by receiving the "sym1.ind" signal from the second layer 220. Thereafter, the third layer 230 may perform the operation 231 of determining whether there is a task to be performed using serial communication as described with reference to FIG. 1. For example, the third layer 230 may perform the operation 231 of determining whether there is data to be transmitted in the queue managed by the third layer 230.

According to the present embodiment of the inventive concept, the second system 200 may again transmit information corresponding to received information to the first system 100 in response to information the first system 100 transmits to the second system 200 so as to reduce power consumption due to serial communication. Accordingly, the first system 100 may also reduce power consumption during serial communication like the second system 200. In this manner, the first system 100 and the second system 200 may stably control their power saving states without generating any error due to serial communication.

Referring to FIG. 4, when the third layer 230 of the second system 200 determines that there is no task to be performed using serial communication in the operation 231, the third layer 230 of the second system 200 may request the second layer 220 to transmit the first symbol SYM1 by transferring the "sym1.req" signal to the second layer 220. Thereafter, the second layer 220 transmits the first symbol SYM1 to the first layer 210. The first layer 210 of the second system 200 may transmit the signal {SYM1} obtained by encapsulating the first symbol SYM1 to the first system 100 through the communication line 50.

The first system 100 may receive the signal {SYM1} and the signal {SYM1} is transmitted through the first layer 110 and the second layer 120 of the first system 100 in the manner as described above. Therefore, the third layer 130 may recognize that the first symbol SYM1 is received from the second system 200. Thereafter, the third layer 130 may send a power saving state entry request to the second layer 120 by transferring a "pss.req" signal to the second layer 120 so as to enable the first layer 110 to enter a power saving state 115. Next, the second layer 120 may send the power saving entry request to the first layer 110 in response to the received "pss.req" signal. Referring to FIG. 4, the first layer 110 of the first system 100 may enter the power saving state 115 by receiving the "pss.req" signal from the second layer 120.

On the other hand, the third layer 230 of the second system 200 may request the second layer 220 to transmit the first symbol SYM1 by transferring the "sym1.req" signal to the second layer 220 and send the power saving entry request to the second layer 220 by transferring the "pss.req" signal to the second layer 220. The second layer 220 may send the power saving state entry request to the first layer 210 in response to the "pss.req" signal received from the third layer 230. Referring to FIG. 4, the first layer 210 of the second system 200 may enter the power saving state 215 by receiving the "pss.req" signal from the second layer 220.

In the embodiment illustrated in FIG. 4, the third layer 230 of the second system 200 may request the second layer 220 to transmit the first symbol SYM1 before sending the power saving entry request to the second layer 220 as compared with the embodiment illustrated in FIG. 1. Accordingly, the first layer 210 of the second system 200 may transmit the first symbol SYM1 to the first system 100 and thereafter enter the power saving state 215. The first layer 110 of the first system 100 may enter the power saving state 115, based on the first symbol SYM1 received from the second system 200. The first layer 110 of the first system 100 and the first layer 210 of the second system 200 may stably enter the power saving states 115 and 215, respectively, after it is confirmed that serial communication is not performed anymore, thereby preventing generation of an overhead (for example, a wakeup operation) due to an unsuitable entry to a power saving state during serial communication.

Figure 5:
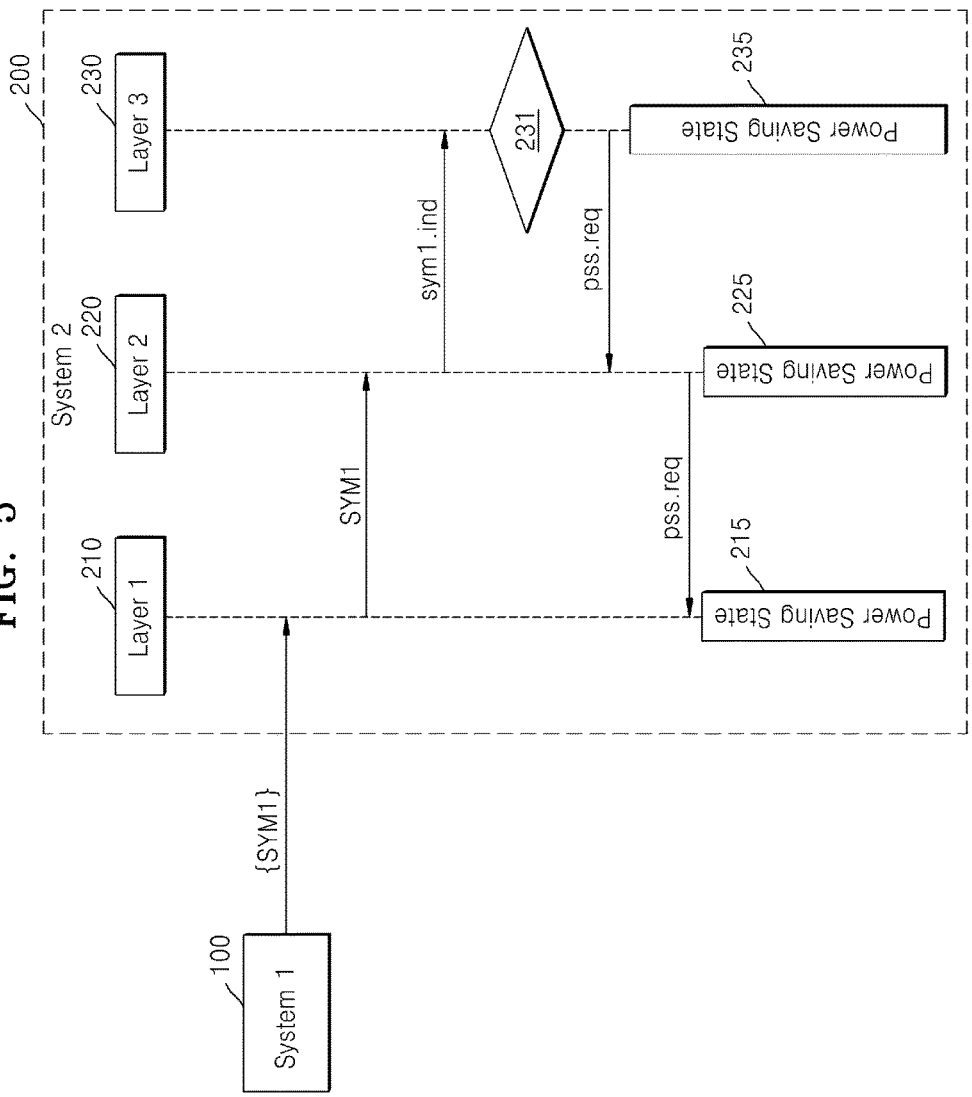
FIG. 5 is a diagram illustrating an operation of the second system shown in FIG. 1 entering a power saving state in layers, according to an embodiment of the inventive concept.

FIG. 5 is a diagram illustrating an operation of the second system 200 shown in FIG. 1 entering a power saving state in respective layers, according to an embodiment of the inventive concept. As described above, the respective layers included in the layered communication structure used for serial communication may be characterized by the relevant power saving states. For example, as illustrated in FIG. 5, the first layer 210, the second layer 220, and the third layer 230 of the second system 200 may be characterized by three power saving states 215, 225 and 235, respectively.

As described with reference to FIG. 1, the first layer 210 of the second system 200 may enter the power saving state 215 based on the first symbol SYM1 received from the first system 100. The process of entering the power saving state 215 based on the first symbol SYM1 received from the first system 100 in the first layer 210 of the second system 200 is similar to that of the embodiment illustrated in FIG. 1.

In the embodiment illustrated in FIG. 5, the second layer 220 and the third layer 230 of the second system 200 may also respectively enter relevant power saving states 225 and 235 based on the first symbol SYM1 received from the first system 100 like the first layer 210 of the second system 200. For example, as illustrated in FIG. 5, the third layer 230 may send a power saving state entry request to the second layer 220 by transferring the "pss.req" signal to the second layer 220 and then enter the power saving state 235. In addition, the second layer 220 of the second system 200 may send the power saving state entry request to the first layer 210 in response to the "pss.req" signal received from the third layer 230 and then enter the power saving state 225. That is, the second layer 220 may enter the power saving state 225 after sending the "pss.req" signal to the first layer 210.

Figure 6:
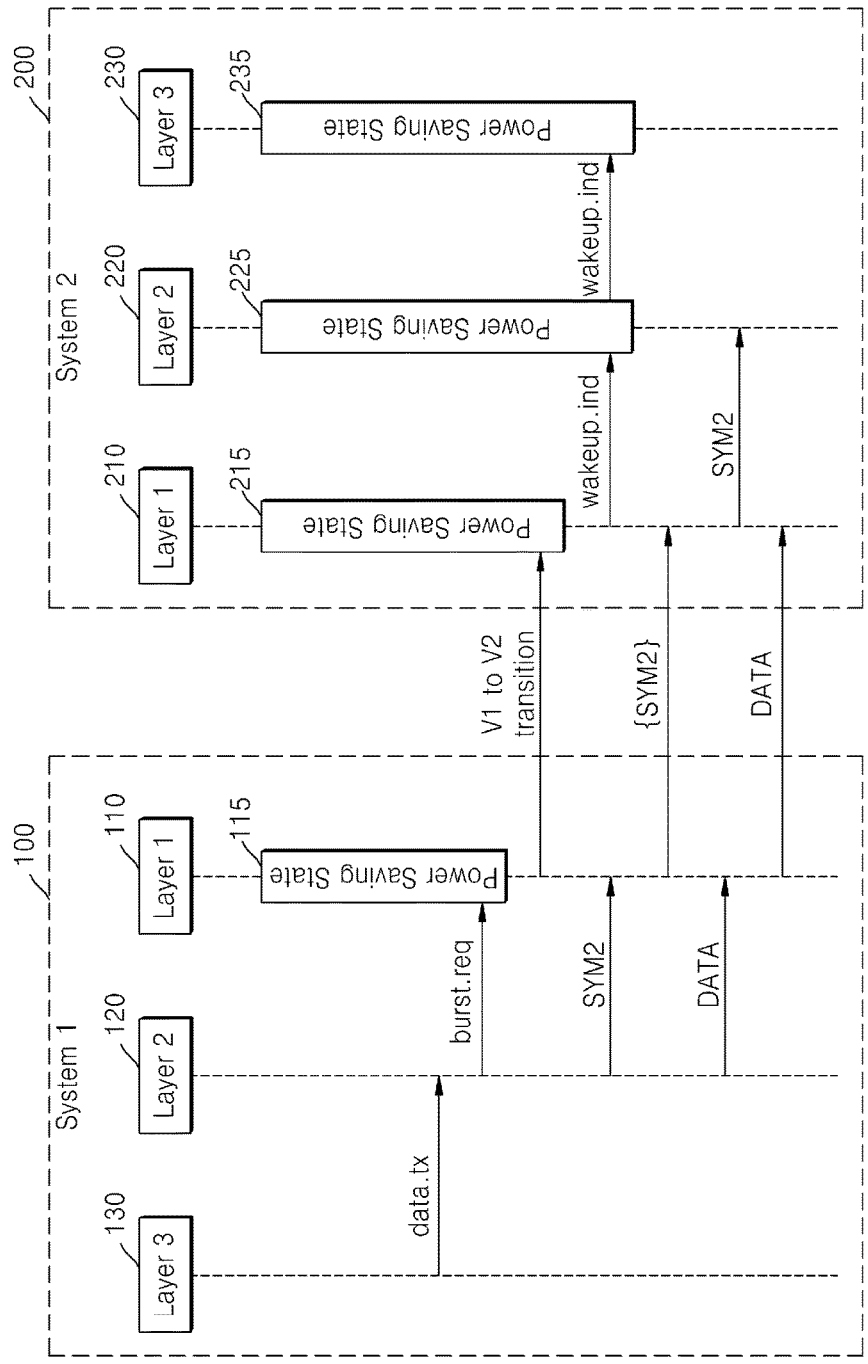
FIG. 6 is a diagram illustrating an operation of the first and second systems shown in FIG. 1 escaping from a power saving state in layers, according to an embodiment of the inventive concept.

FIG. 6 is a diagram illustrating an operation of the first and second systems 100 and 200 shown in FIG. 1 escaping from a power saving state in respective layers, according to an embodiment of the inventive concept. In the foregoing embodiments, the respective layers of the first and second systems 100 and 200 may respectively enter relevant power saving states. On the other hand, the first and second systems 100 and 200 may escape from the relevant power saving states so as to again transmit and receive data using serial communication. For example, the third layer 130 of the first system 100 may receive a request for transmission of data to the second system 200 from application software executed in the first system 100. In this case, when relevant power saving states 115, 215, 225, and 235 correspond to the first layer 110 of the first system 100, and the first layer 210, the second layer 220, and the third layer 230 of the second system 200, the layers 110, 210, 220 and 230 may escape from the respective relevant power saving states 115, 215, 225, and 235.

Escape from a power saving state in layers included in a layered communication architecture may be referred to as a "wakeup". A time until the layers escape from the relevant power saving states and enter a communicable state may be referred to as "wakeup overhead". The wakeup overhead may affect power consumption during serial communication. For example, when the wakeup overhead is large (that is, when the time until the layers escape from the relevant power saving states and enter a communicable state is long), the first system 100 may reduce the number of times that the layers enter the power saving states by transmitting the first symbol SYM1 to the second system 200. That is, since the wakeup overhead is large, it is necessary to ensure that the first system 100 is in a power saving state for a specific time (for example, a time long enough to compensate for the wakeup overhead) so as to deal with the wakeup overhead. Therefore, a decrease in the wakeup overhead may be one factor for decreasing power consumption in serial communication.

In addition, decrease of the wakeup overhead may improve serial communication efficiency. For example, in a case where the respective layers of the first system 100 and the second system 200 are in the relevant power saving states, when the first system 100 attempts to transmit data by application software that is being executed in the first system 100, the decrease in the wakeup overhead may enable a rapid start of data transmission. Therefore, the data transmission from the first system 100 to the second system 200 may be rapidly completed.

Referring to FIG. 6, the third layer 130 of the first system 100 may request data transmission from the second layer 120 by transferring a "data.tx" signal to the second layer 120 in response to a data transmission request from application software that is being executed in the first system 100. The second layer 120 may inform the first layer 110 of restart of serial communication in response to the "data.tx" signal received from the third layer 130. For example, referring to FIG. 6, the second layer 120 may inform the first layer 110 of the restart of serial communication by transferring a "burst.req" signal to the first layer 110.

Referring to FIG. 6, the first layer 110 of the first system 100 which is in the power saving state 115 may escape from the power saving state 115 by receiving the "burst.req" signal from the second layer 120. As described above, while the first layer 110 is in the power saving state 115, the communication line 50 may be at a first logic level L1 (or voltage V1) according to a protocol the first layer 110 of the first system 100 and the first layer 210 of the second system 200 share with each other. When the first layer 110 of the first system 100 escapes from the power saving state 115 in response to the "burst.req" signal received from the second layer 120, the first layer 110 of the first system 100 may enable the communication line 50 to transition from the first logic level L1 to a second logic level L2 (or voltage V2). The transition from the first logic level L1 to the second logic level L2 may be defined by the protocol commonly used by the first layers 110 and 210.

The first layer 210 of the second system 200 may detect that the communication line 50 transitions from the first logic level L1 to the second logic level L2. When detecting that the communication line 50 transitions from the first logic level L1 to the second logic level L2, the first layer 210 may escape from the power saving state 215. According to an embodiment of the inventive concept, the first layer 210 may request the higher layers of the first layer 210, that is, the second layer 220 and the third layer 230, to escape from the relevant power saving states. For example, referring to FIG. 6, the first layer 210 transfers a "wakeup.ind" signal to the second layer 220 and the third layer 230 simultaneously. In the embodiment of FIG. 6, although the "wakeup.ind" signal transferred to the third layer 230 is illustrated as being transferred from the second layer 220, it is understood that the "wakeup.ind" signal transferred to the third layer 230 is a signal transferred from the first layer 210 since the "wakeup.ind" signal transferred to the third layer 230 is transferred at the same position in a vertical direction or the same time point as the "wakeup.ind" signal transferred from the first layer 210 to the second layer 220.

The second layer 220 and the third layer 230 of the second system 200 may respectively receive the "wakeup.ind" signal from the first layer 210, and therefore, respectively escape from the power saving states 225 and 235. The first layer 210 of the second system 200 may rapidly escape from the power saving state 215 due to a physical change (for example, a transition from the first logic level L1 to the second logic level L2) in the communication line 50. The second layer 220 and the third layer 230 may respectively escape from the power saving states 225 and 235 by receiving the "wakeup.ind" signal from the first layer 210. That is, the third layer 230 may rapidly escape from the power saving state 235 through the "wakeup.ind" signal received without passing through the second layer 220. Although the first layer 210 of the second system 200 is illustrated as transferring the "wakeup.ind" signal to the second layer 220 and the third layer 230 in FIG. 6, this is merely exemplary. For example, the first layer 210 may transfer the "wakeup.ind" signal to a high layer of the third layer 230 or application software that is being executed in the second system 200.

The second layer 120 of the first system 100 may transfer the "burst.req" signal to the first layer 110, and thereafter transfer a second symbol SYM2 to the first layer 110. For example, the second symbol SYM2 may provide data transmission start information for the second layer 220 of the second system 200 or the third layer 230 that is a higher layer of the second layer 220 as a burst mode. Referring to FIG. 6, the second symbol SYM2 from the second layer 120 of the first system 100 may be transferred to the second system 200 as a signal {SYM2} obtained by the first layer 110 encapsulating the second symbol SYM2. The signal {SYM2} may be transferred to the second layer 220 through the first layer 210 of the second system 200. The second layer 120 of the first system 100 may transfer data to the first layer 110 according to a data transmission request transferred from the third layer 130. The first layer 110 may transmit the signal {SYM2} to the second system 200 through the communication line 50.

Figure 7:
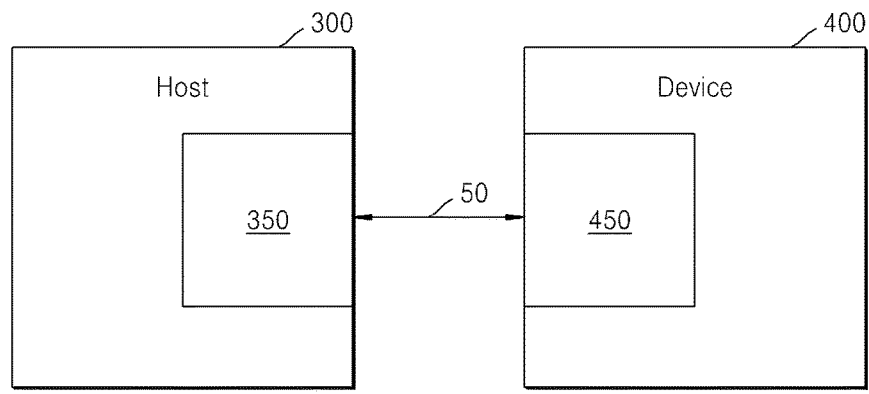
FIG. 7 is a block diagram illustrating the configuration of a host and a device that perform serial communication, according to an embodiment of the inventive concept.

FIG. 7 is a block diagram illustrating the configuration of a host 300 and a device 400 that perform serial communication, according to an embodiment of the inventive concept. As shown, the host 300, such as a personal computer, a mobile phone, or a PDA, or the like, and the device 400, such as a memory card or a solid state drive (SSD), or the like, may perform serial communication through the communication line 50. The host 300, that communicates with the device 400 such as a memory card or a SSD which stores data, may perform a task of transmitting or receiving a large amount of data. Therefore, the host 300 and the device 400 may perform serial communication enabling data to be transmitted and received at a high speed. In particular, when the device 400 is a data storage device including a flash memory, a universal flash storage (UFS) may be used to define an interface between the host 300 and the device 400. As described above, the UFS may adopt an M-PHY and a UniPro defined in the Mobile Industry Processor Interface (MIPI) Alliance.

Referring to FIG. 7, the host 300 and the device 400 may include a host interface 350 and a device interface 450 connected to each other through the communication line 50, respectively. Serial communication between the host 300 and the device 400 may be performed through the host interface 350 and the device interface 450. As in the above-described first and second systems 100 and 200, the host 300 and the device 400 may perform serial communication by using a layered communication architecture. Layers corresponding to the host 300 and the device 400 may be respectively implemented in the host interface 350 and the device interface 450. For clarity, the host interface 350 and the device interface 450 may be omitted in accompanying drawings.

Figure 8:
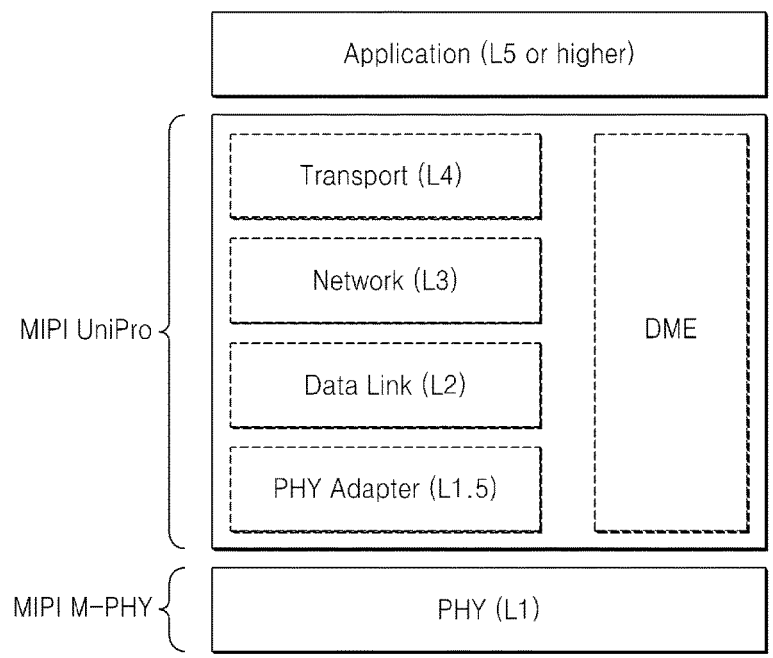
FIG. 8 is a diagram illustrating a protocol stack of an M-PHY and a UniPro, according to an embodiment of the inventive concept.

FIG. 8 is a diagram illustrating a protocol stack of the M-PHY and the UniPro, according to an embodiment of the inventive concept. The M-PHY is a layer corresponding to the physical layer L1 of the OSI model and may correspond to a physical layer. The M-PHY is a physical layer defining physical and electric specifications of the communication line 50 and may define a layout of pins to which the communication line 50 connects, voltages, a line impedance, a cable specification, or signal timing, or the like. The M-PHY will be described in detail with reference to FIG. 9.

The UniPro that is a higher layer of the M-PHY may correspond to a plurality of layers included in the OSI model. That is, the UniPro may correspond to the transport layer L4, the network layer L3, the data link layer L2 of the OSI model in descending order, and may additionally correspond to the PHY adaptor layer L1.5 that is not defined in the OSI mode as illustrated in FIG. 8. The PHY adaptor layer L1.5 may perform a function of masking differences between other physical layers with respect to a higher layer (the data link layer L2) such that the UniPro supports a plurality of physical layers (for example, M-PHY and D-PHY). The device management entity (DME) may control the four layers L1.5, L2, L3 and L4 of the UniPro. The DME may enable the four layers to access control and state parameters and manage a power saving mode. The application layer that is the higher layer of the UniPro may correspond to the session layer L5 and the higher layers of the session layer L5 of the OSI model. The application layer may perform interaction with application software.

Figure 9:
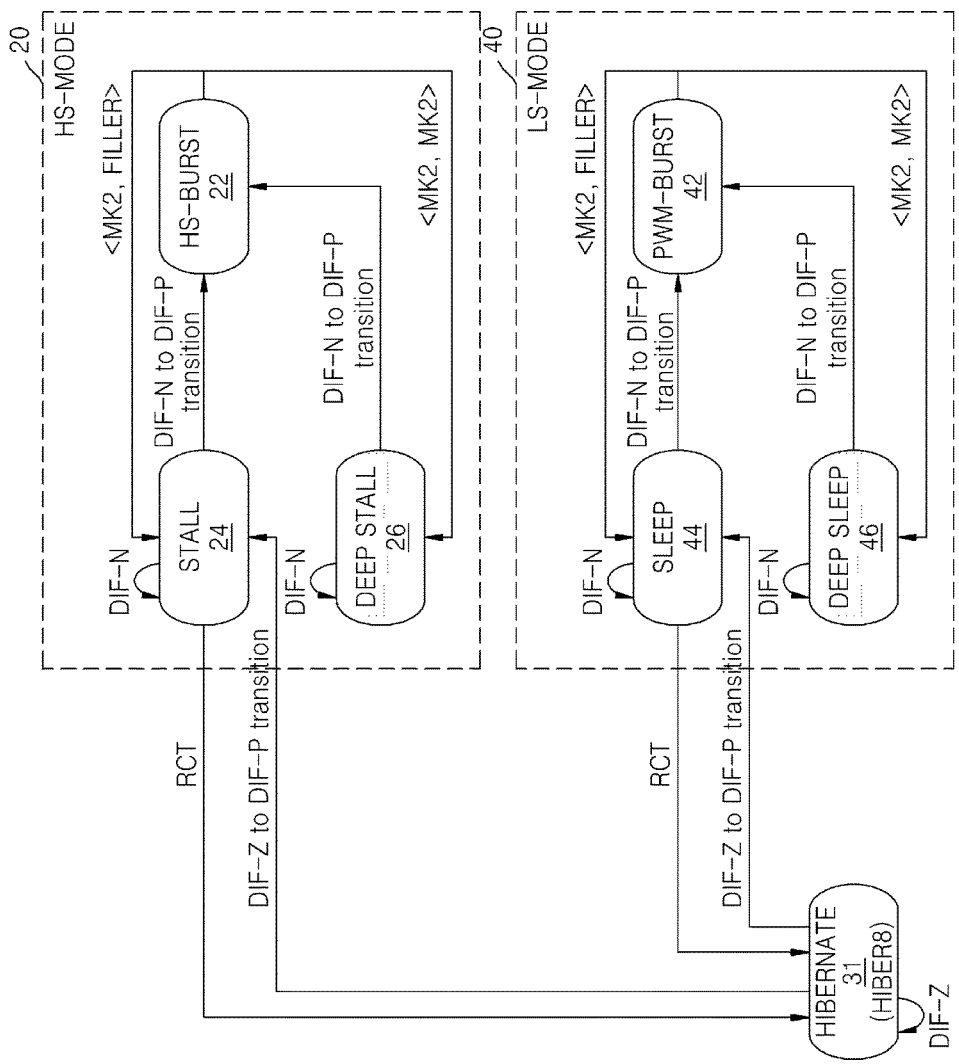
FIG. 9 is a diagram illustrating a state diagram of the M-PHY at the time of data reception, according to an embodiment of the inventive concept.

FIG. 9 is a diagram illustrating a state diagram 1 of the M-PHY at the time of data reception, according to an embodiment of the inventive concept. The state diagram 1 of FIG. 9 shows some states of the M-PHY for description of the inventive concept. Referring to FIG. 9, the state diagram 1 may include a hibernate (or hiber8) state 31 (hereinafter, referred to "hiber8 state"). The hiber8 state 31 is the maximum power saving state supported by the M-PHY, in which power supplied to components for serial communication (with the exception of a circuit that detects a logic level of the communication line 50—for example, a circuit that detects a DIF-Z to DIF-P transition) may be cut off.

On the other hand, the M-PHY may support an HS-mode 20 (a high speed mode) and an LS-mode 40 (a low speed mode). Referring to FIG. 9, the HS-mode 20 of the M-PHY may include an HS-burst state 22 and a stall state 24. The HS-burst state 22 may correspond to a state in which data is received at a high speed. The stall state 24 may correspond to a state in which data is not received in a high-speed mode, that is, a sleep state. The M-PHY may maintain the communication line 50 at a DIF-N in the stall state 24.

On the other hand, the LS-mode 40 of the M-PHY may include a pulse width modulation (PWM)-burst state 42 and a sleep state 44. The PWM-burst state 42 may correspond to a state in which data is received at a low speed. The sleep state 44 may correspond to a state in which data is not received in a low-speed mode, that is, a sleep state. The M-PHY may maintain the communication line 50 at the DIF-N in the sleep state 44, as in the stall state 24 of the HS-mode 20.

Referring to FIG. 9, when the M-PHY receive a symbol <MK2, FILLER>, the M-PHY may transition from the HS-burst state 22 and the PWM-burst state 42 to the stall state 24 and the sleep state 44, respectively. In addition, when the logic level of the communication line 50 transitions from the DIF-N to a DIF-P, the M-PHY may transition from the stall state 24 and the sleep state 44 to the HS-burst state 22 and the PWM-burst state 42, respectively. The DIF-N may refer to a "0" level or a low level in a differential communication line, and the DIF-P may refer to a "1" level or a high level in the differential communication line. The host interface 350 or the device interface 450 of FIG. 7 may include a circuit that detects a DIF-N to DIF-P transition. By the circuit, a state transition may occur in the state diagram 1.

According to an embodiment of the inventive concept, the M-PHY may include a first power saving state. The first power saving state is a state between the stall state 24 and the sleep state 44, which are the sleep states of the HS-mode 20 and the LS-mode 40, and the hiber8 state which is the maximum power saving state. The first power saving state may be a state in which wakeup is performed at a higher speed compared to the hiber8 state 31, and may be characterized by lower power consumption than the sleep states (that is, the stall state 24 and the sleep state 44). Referring to FIG. 9, the HS-mode 20 and the LS-mode 40 may include a deep stall state 26 and a deep sleep state 46, respectively, as the first power saving state of the M-PHY. The deep stall state 26 and the deep sleep state 46 will be described in detail with reference to FIG. 12. When the M-PHY is in the hiber8 state 31, the stall state 24, the deep stall state 26, the sleep state 44, or the deep sleep state 46, this may be referred to as "the M-PHY is in a power saving state".

When a symbol <MK2, MK2> is received in the HS-burst state 22, the M-PHY may transition from the HS-burst state 22 to the deep stall state 26. When the state diagram 1 of FIG. 9 is a state diagram of the M-PHY implemented in the device 400 of FIG. 7 (or the device interface 450 included in the device 400), the symbol <MK2, MK2> may be received from the host 300 of FIG. 7 (or the host interface 350 of the host 300). In addition, when the logic level of the communication line 50 transitions from the DIF-N to the DIF-P, the M-PHY may transition from the deep stall state 26 to the HS-burst state 22. In a similar manner to the case of the deep stall state 26, when the symbol <MK2, MK2> is received in the PWM-burst state 42, the M-PHY may transition from the PWM-burst state 42 to the deep sleep state 46. In addition, when the logic level of the communication line 50 transitions from the DIF-N to the DIF-P, the M-PHY may transition from the deep sleep state 46 to the PWM-burst state 42.

Referring to FIG. 9, when a re-configuration trigger (RCT) signal is received in the stall state 24 or the sleep state 44, the M-PHY may transition from the stall state 24 or the sleep state 44 to the hiber8 state 31. In addition, when the logic level of the communication line 50 transitions from the DIF-Z to the DIF-P, the M-PHY may transition to the stall state 24 or the sleep state 44. The M-PHY may maintain the communication line 50 at the DIF-Z in the sleep state 44. The DIF-Z may be a logic level in which the two lines in a pair of differential communication lines are at the same level (for example, the same voltage level).

The M-PHY may transition from the hiber8 state 31 to a data receivable state (for example, the HS-burst state 22 or the PWM-burst state 42) by passing through one or more states (for example, the stall state 24 or the sleep state 44), whereas the M-PHY may directly transition from the first power saving state (for example, the deep stall state 26 or the deep sleep state 46) to the data receivable state (for example, the HS-burst state 22 or the PWM-burst state 42). In addition, when the M-PHY transitions from the first power saving state (for example, the deep stall state 26 or the deep sleep state 46) to the data receivable state (for example, the HS-burst state 22 or the PWM-burst state 42), the M-PHY may transfer a wakeup signal to the higher layers of the M-PHY itself, thereby enabling the higher layers to rapidly escape from a power saving state, which will be described below.

Figure 10:
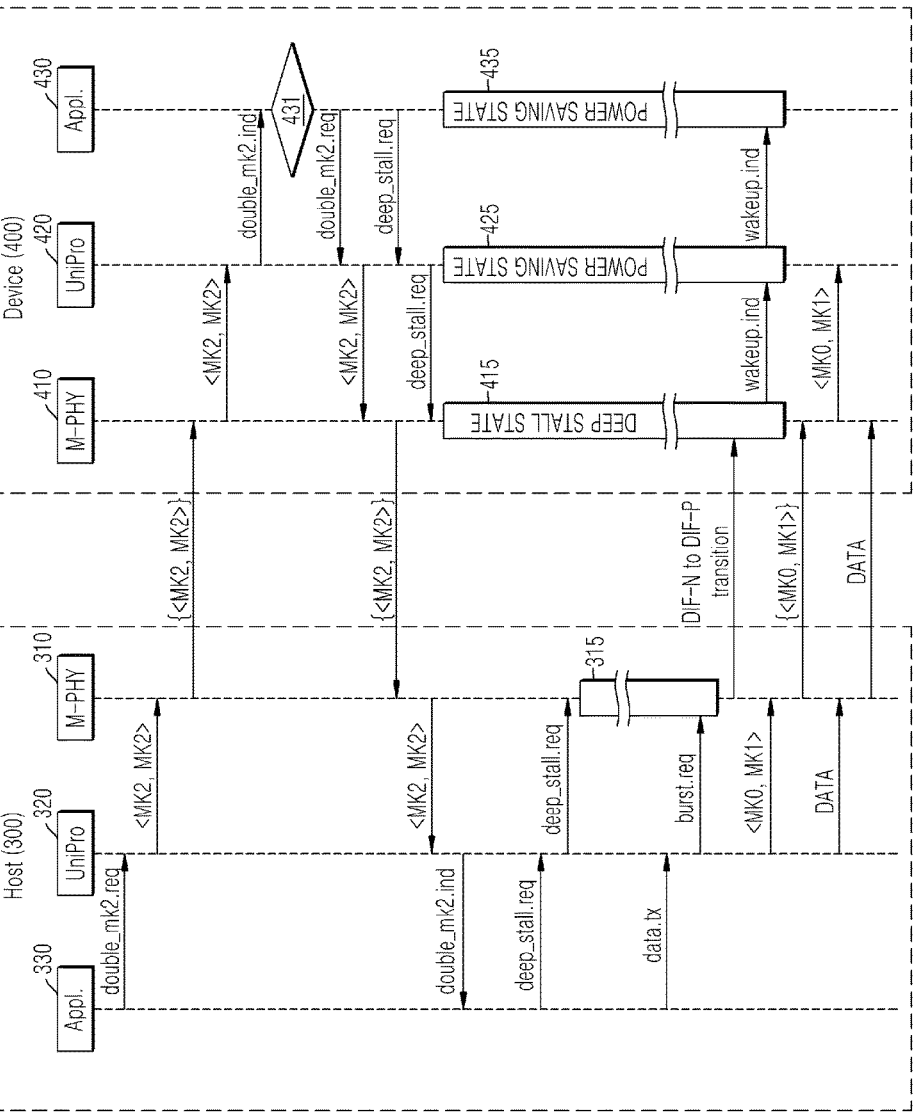
FIG. 10 is a diagram illustrating the timing of an operation of M-PHYs of the host and the device shown in FIG. 7 which perform serial communication with each other, entering a power saving state and escaping from the power saving state, according to an embodiment of the inventive concept.

FIG. 10 is a diagram illustrating the timing of an operation of M-PHYs of the host 300 and the device 400 shown in FIG. 7 which perform serial communication with each other, entering a power saving state and escaping from the power saving state, according to an exemplary embodiment of the inventive concept. Although FIG. 10 is presented with reference to the HS-mode 20 of the state diagram 1 of FIG. 9, it is understood that the operation illustrated in FIG. 10 is similarly applicable to the LS-mode 40. In the following description, the description with reference to FIGS. 1 to 6 will be omitted with respect to serial communication between the first system 100 and the second system 200 of FIG. 2.

Referring to FIGS. 7 and 10, according to an exemplary embodiment of the inventive concept, the host 300 and the device 400 may perform serial communication with each other using a layered communication architecture including three layers. Referring to FIG. 10, the host 300 may perform serial communication with the device 400 by using a layered communication architecture including an application layer 330, a UniPro 320, and an M-PHY 310. Similarly, the device 400 may also perform serial communication with the host 300 by using a layered communication architecture including an application layer 430, a UniPro 420, and an M-PHY 410.

Referring to FIG. 10, the application layer 330 of the host 300 may receive a power saving entry request from application software that is being executed in the host 300. The application layer may request the UniPro 320 to transmit a symbol <MK2, MK2>, which is a data unit of the UniPro 320, by transferring a "double_mk2.req" signal to the UniPro 320. The UniPro 320 may transfer the symbol <MK2, MK2> to the M-PHY 310 in response to the "double_mk2.req" signal. The M-PHY 310 may transfer a signal {<MK2, MK2>} obtained by encapsulating the symbol <MK2, MK2> to the device 400 through the communication line 50.

When the signal {<MK2, MK2>} is received, the M-PHY 410 of the device 400 may transfer the symbol <MK2, MK2> to the UniPro 420, and the UniPro 420 may transfer a "double_mk2.ind" signal to the application layer 430. The application layer 430 may perform an operation 431 of determining whether there is data to be transmitted to the host 300, and when there is no data to be transmitted, may request the device 400 to transmit the symbol <MK2, MK2> by transferring the "double_mk2.req" signal to the UniPro 420.

In response to the request from the application layer 430, the application layer 330 of the host 300 may recognize reception of the symbol <MK2, MK2>. Accordingly, the application layer 330 of the host 300 may send a power saving entry request to the M-PHY 310. The M-PHY 310 may enter a power saving state 315 in response to a "deep_stall.req" signal received through the UniPro 320. The power saving state 315 may correspond to the deep stall state 26 of FIG. 9.

On the other hand, after the device 400 transmits the symbol <MK2, MK2> to the host 300, the layers 410, 420 and 430 may enter relevant power saving states 415, 425 and 435, respectively. The process of entering to the power saving states 415, 425 and 435 in the layers 410, 420, and 430 is similar to the description with reference to FIG. 5. The deep stall state 415 that the M-PHY 410 of the device 400 enters may correspond to the deep stall state 26 of FIG. 9.

The process of escaping from the power saving states in the layers of the host 300 and the device 400 is similar to the description with reference to FIG. 6. In the embodiment illustrated in FIG. 10, the M-PHY 310 of the host 300 may enable the communication line 50 to transition from the DIF-N to the DIF-P so as to inform the device 400 to escape from the power saving state. The M-PHY 410 of the device 400 may escape from the deep stall state 415 by detecting that the communication line 50 transitions from the DIF-N to the DIF-P in the deep stall state 415 (for example, in the deep stall state 26 of FIG. 9).

The M-PHY 410 may transfer a "wakeup.ind" signal to the UniPro 420 and the application layer 430 simultaneously and therefore, the UniPro 420 and the application layer 430 may escape from the power saving states 425 and 435, respectively. The host 300 may transmit the symbol <MK0, MK1> to the device 400 and then transmit data to the device 400. The <MK0, MK1> may provide data transmission start information to the device 400 as a burst mode.

Figure 11:
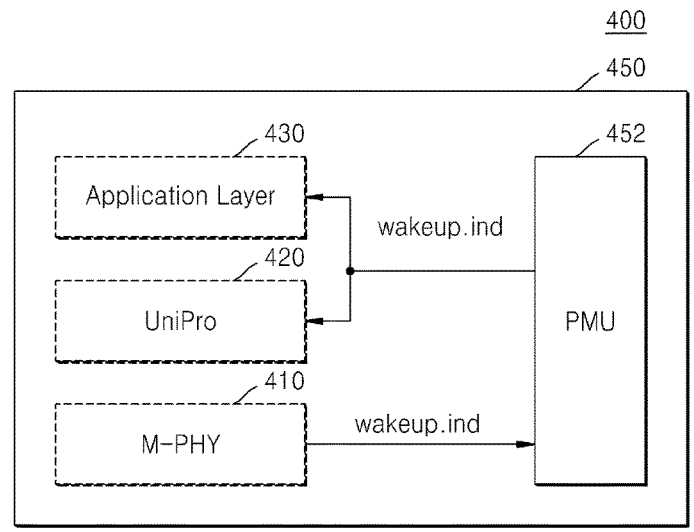
FIG. 11 is a diagram illustrating an operation of the M-PHY waking up in higher layers, according to an embodiment of the inventive concept.

FIG. 11 is a diagram illustrating an operation of the M-PHY waking up in higher layers, of according to an embodiment of the inventive concept. As described with reference to FIG. 7, the device 400 may include the device interface 450 that performs serial communication. The M-PHY 410, the UniPro 420, and the application layer 430 as described with reference to FIG. 10 may be implemented in the device interface 450. Referring to FIG. 11, the device interface 450 may include a power management unit (PMU) 452. The PMU 452 may control or manage power consumption of the device interface 450.

Referring to FIGS. 10 and 11, according to an embodiment of the inventive concept, when the M-PHY 410 of the device 400 (or the device interface 450) detects that the communication line 50 transitions from the DIF-N to the DIF-P, the M-PHY 410 may enable the UniPro 420 and the application layer 430, which are higher layers thereof, to wake up simultaneously. To this end, referring to FIG. 11, the M-PHY 410 may transfer a "wakeup.ind" signal to the PMU 452, and the PMU 452 may transfer the "wakeup.ind" signal to the UniPro 420 and the application layer 430 simultaneously. Accordingly, the UniPro 420 and the application layer 430 may rapidly escape from the power saving states 425, 435. On the other hand, although the PMU 452 is illustrated as transferring the "wakeup.ind" signal to the UniPro 420 and the application layer 430, this is merely exemplary. For example, the PMU 452 may transfer the "wakeup.ind" signal or a relevant signal to other elements outside the device interface 450, for example, to application software that is being executed in the device 400, based on the "wakeup.ind" signal received from the M-PHY 410.

Figure 12:
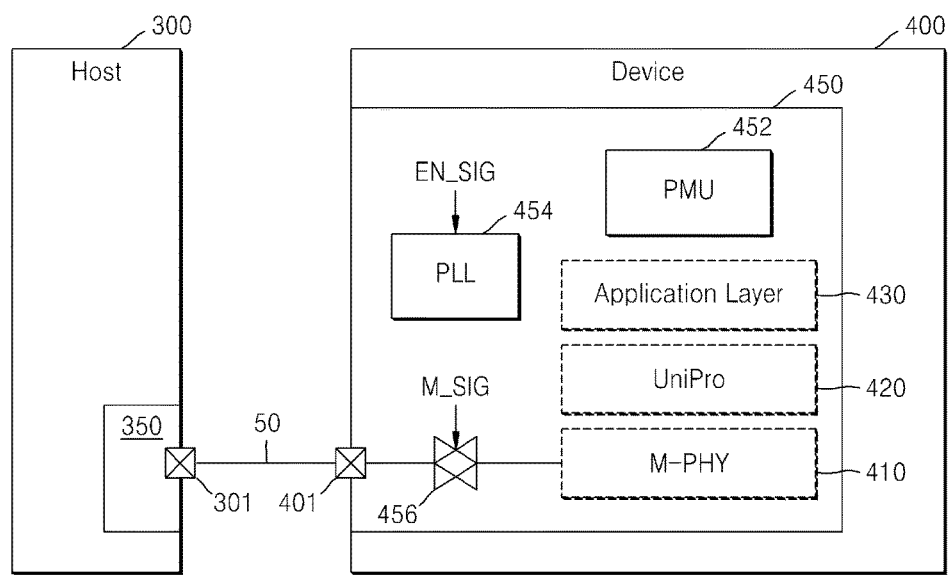
FIG. 12 is a diagram illustrating a configuration of a device interface shown in FIG. 7 in a power saving state, according to an embodiment of the inventive concept.

FIG. 12 is a diagram illustrating a configuration of the device interface 450 shown in FIG. 7 in a power saving state, according to an embodiment of the inventive concept. Referring to FIG. 12, the M-PHY 410, the UniPro 420, and the application layer 430 may be implemented in the device interface 450. In addition, the device interface 450 may include the PMU 452, a PLL 454, and a masking unit 456 as illustrated in FIG. 12. As described with reference to FIG. 11, the PMU 452 may control or manage power consumption of the device interface 450. The device interface 450 may be connected to the communication line 50 through a port 401, and the communication line 50 may be connected to a port 301 of the host interface 350 included in the host 300.

The PLL 454 may generate a clock signal or the like which are necessary for serial communication. The clock signal may have a high frequency for high-speed data transmission and reception. Therefore, the clock signals may frequently transition between different logic levels. The PLL 454 that generates the clock signal may consume relatively high power. The PLL 454 may receive an enable signal EN_SIG, and may be turned on or turned off according to the enable signal EN_SIG. When the PLL 454 is turned off according to the enable signal EN_SIG, power consumption of the PLL 454 may be minimized Referring to FIG. 12, the masking unit 456 may be connected to the M-PHY 410 and be connected to the communication line 50 through the port 401. The masking unit 456 may mask the port 401 connected to the communication line 50 according to a masking signal M_SIG. That is, the masking signal M_SIG may pass or block a signal to be transferred between the M-PHY 410 and the communication line 50. For example, when the masking unit 456 blocks a signal to be transferred between the M-PHY 410 and the communication line 50 according to the masking signal M_SIG, current may be prevented from leaking through the communication line 50. According to an embodiment of the inventive concept, the masking unit 456 may include a tri-state buffer.

Referring to FIGS. 9 and 12, according to an exemplary embodiment, when the M-PHY 410 is in the deep stall state 26 or the deep sleep state 46, the M-PHY 410 may turn off the PLL 454 by controlling the enable signal EN_SIG. In addition, when the M-PHY 410 is in the deep stall state 26 or the deep sleep state 46, the M-PHY 410 may block a signal passing through the masking unit 456 by controlling the masking signal M_SIG. According to an embodiment of the inventive concept, the M-PHY 410 may directly control the enable signal EN_SIG and the masking signal M_SIG. In addition, the M-PHY 410 may control the enable signal EN_SIG and the masking signal M_SIG that are output by the PMU 452 by controlling the PMU 452.

On the other hand, although FIG. 12 illustrates the device interface 450 in detail, the host interface 350 included in the host 300 may have a configuration similar to that of the device interface 450 illustrated in FIG. 12. The host interface 350 may operate in a manner similar to the operation of the device interface 450 in the power saving state as described above.

Figure 13:
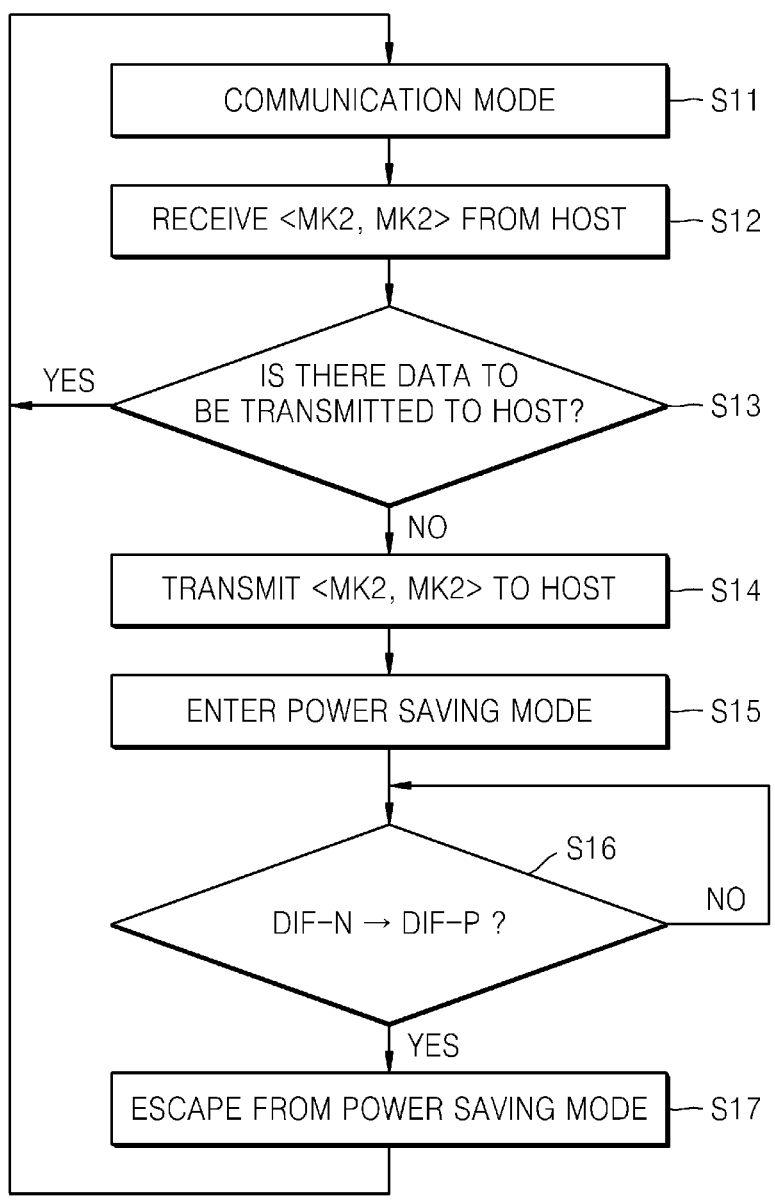
FIG. 13 is a flowchart illustrating an operation of the device interface shown in FIG. 7 entering a power saving mode or escaping from the power saving mode, according to an embodiment of the inventive concept.

FIG. 13 is a flowchart illustrating an operation of the device interface 450 shown in FIG. 7 entering a power saving mode or escaping from the power saving mode, according to an embodiment of the inventive concept. The device interface 450 may have a power saving mode. For example, referring to FIG. 10, the M-PHY 410, the UniPro 420, and the application layer 430 implemented in the device interface 450 may be characterized by the power saving states 415, 425 and 435. When the device interface 450 is in the power saving mode, the M-PHY 410, the UniPro 420, and the application layer 430 may be in the power saving states 415, 425 and 435, respectively.

Referring to FIGS. 7 and 13, the device interface 450 may be in a communication mode (S11) in which data is transmittable to and receivable from the host 300 (or the host interface 350). The device interface 450 may receive the symbol <MK2, MK2> from the host 300 (S12). The device interface 450 may determine whether there is data to be transmitted to the host 300 (S13). When there is data to be transmitted to be host 300, the device interface 450 may return to the communication mode, instead of entering the power saving mode. On the other hand, when no data to be transmitted to the host 300 exists, the device interface 450 may transmit the symbol <MK2, MK2> to the host 300 so as to set the host interface 350 of the host 300 to the power saving mode (S14). Thereafter, the device interface 450 may enter the power saving mode (S15). For example, the M-PHY 410, the UniPro 420 and the application layer 430 implemented in the device interface 450 may enter the power saving states 415, 425, and 435, respectively.

When the device interface 450 is in the power saving mode, the device interface 450 may determine whether the logic level of the communication line 50 transitions from the DIF-N to the DIF-P (S16). When the logic level of the communication line 50 transitions from the DIF-N to the DIF-P, the device interface 450 may escape from the power saving mode (S17). In this case, the M-PHY 410 implemented in the device interface 450 may simultaneously transfer a signal indicating wakeup to the UniPro 420 and the application layer 430 that are the higher layers thereof, so as to rapidly escape form the power saving mode. Thereafter, the device interface 450 may enter the communication mode in which data is transmittable to and receivable from the host 300.

Figure 14:
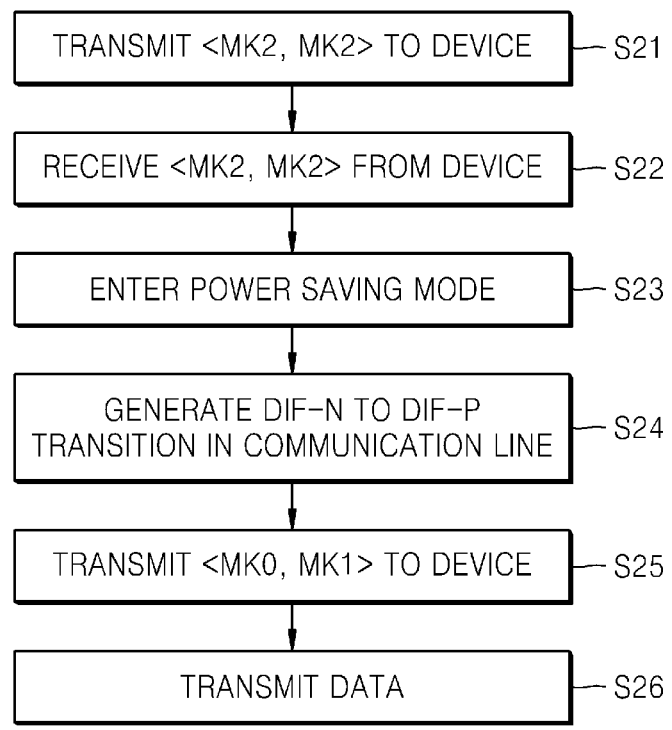
FIG. 14 is a flowchart illustrating an operation of the host interface shown in FIG. 7 entering a power saving mode or escaping from the power saving mode, according to an embodiment of the inventive concept.

FIG. 14 is a flowchart illustrating operation of the host interface 350 of FIG. 7 entering a power saving mode or escaping from the power saving mode, according to an embodiment of the inventive concept. The host interface 350 may also provide a power saving mode as in the device interface 450. For example, referring to FIG. 10, when the host interface 350 is in the power saving mode, the M-PHY 310 may be in the power saving state 315. Although not illustrated in FIG. 10, the UniPro 320 and the application layer 330 of the host 300 may be characterized by relevant power saving states. When the host interface 350 is in the power saving mode, the UniPro 320 and the application layer 330 may be in the relevant power saving states, respectively.

Referring to FIGS. 7 and 14, the host interface 350 may transmit <MK2, MK2> to the device 400 so as to set the device interface 450 to the power saving mode (S21). When there is no data to be transmitted from the device interface 450 to the host 300, the host interface 350 may receive the symbol <MK2, MK2> from the device 400 (S22). The host interface 350 may enter the power saving mode based on the symbol <MK2, MK2> received from the device 400 (S23).

When the host interface 350 is requested to transmit data by application software that is being executed in the host 300, the host interface 350 may generate a DIF-N to DIF-P transition of the communication line 50 so as to enable the device interface 450 to escape from the power saving mode (S24). According to an embodiment, due to the DIF-N to DIF-P transition generated by the host interface 350, the device interface 450 may rapidly escape from the power saving mode. The host interface 350 may transmit the symbol <MK0, MK1> providing data transmission start information as a burst mode to the device 400 (S25). Thereafter, the host interface 350 may transmit data, the transmission of which is requested by the application software that is being executed in the host 300, to the device 400 (S26).

Figure 15:
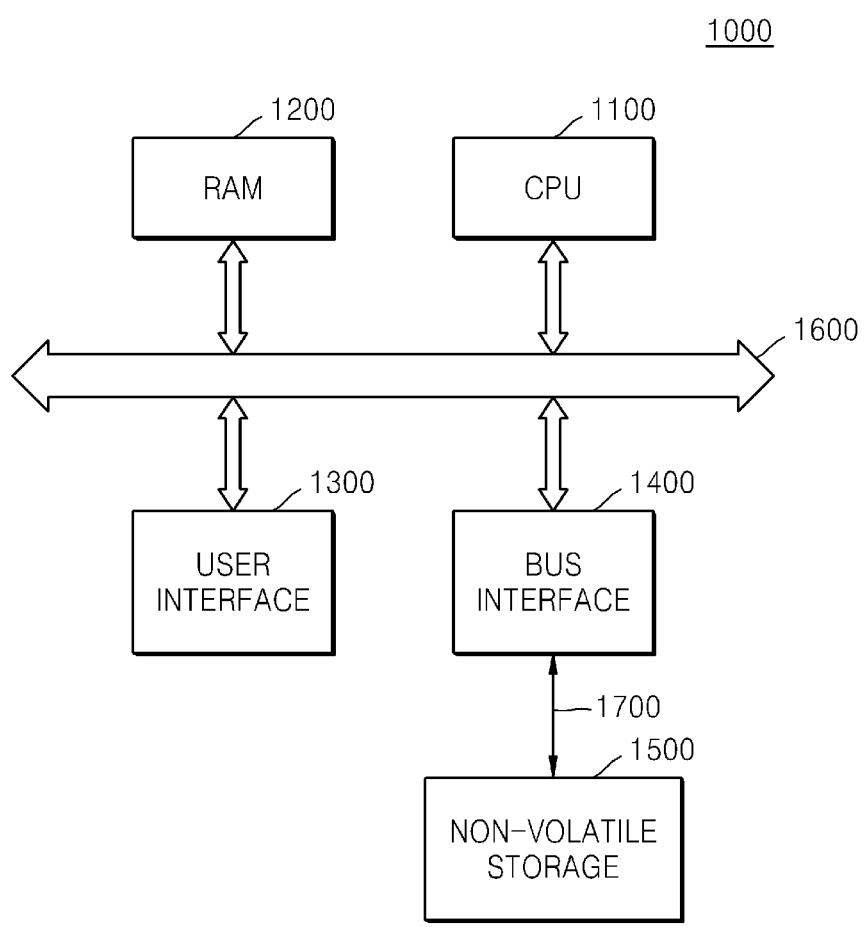
FIG. 15 is a block diagram illustrating a computing system using serial communication, according to an embodiment of the inventive concept.

FIG. 15 is a block diagram illustrating a computing system 1000 using a serial communication method according to an embodiment of the inventive concept. In the computing system 1000, such as a mobile device or a desktop computer, the serial communication method according to any one of the embodiments of the inventive concept may be used as a serial communication method between a bus interface 1400 and a non-volatile storage 1500.

The computing system 1000 according to an embodiment of the inventive concept may include a central processing device (CPU) 1100, a random access memory (RAM) 1200, a user interface 1300, a bus interface 1400, and a non-volatile storage 1500. The CPU 1100, the RAM 1200, the user interface 1300, and the bus interface 1400 may be electrically connected to a bus 1600. A non-volatile memory device included in the non-volatile storage 1500 may be, for example, a NAND flash memory, a NOR flash memory, a magnetic RAM (MRAM), a resistance RAM (RRAM), a ferroelectric RAM (FRAM), or a phase change memory (PCM), or the like.

The CPU 1100 may control the computing system 1000 and communicate with other elements through the bus 1600. The RAM 1200 may include a volatile memory capable of reading or writing data at a high speed and may function as a data memory for the CPU 1100. The user interface 1300 may receive an instruction from a user of the computing system 1000 or may provide data generated by the computing system 1000 to the user through image display or voice output.

The bus interface 1400 may be disposed between the bus 1600 and the non-volatile storage 1500. The bus interface 1400 may be connected to the non-volatile storage 1500 through a serial communication line 1700. The bus interface 1400 may transfer data received from the non-volatile storage 1500 through the serial communication line 1700 to other elements through the bus 1600 and transfer data received from the other elements through the bus 1600 to the non-volatile storage 1500 through the serial communication line 1700.

The bus interface 1400 may correspond to the first system 100 or the first interface 150 included in the first system 100 as described in the foregoing embodiments and may perform the operations of the first system 100 or the first interface 150 as described in the foregoing embodiments. On the other hand, the non-volatile storage 1500 may correspond to the second system 200 as described in the foregoing embodiments and may include an element corresponding to the second interface 250 of the second system 200.

On the other hand, when the non-volatile storage 1500 includes a flash memory, serial communication between the bus interface 1400 and the non-volatile storage 1500 may comply with the UFS standard. Thus, M-PHY and UniPro may be respectively used as a physical layer and a higher layer of the physical layer. In this case, the bus interface 1400 may correspond to the host 300 or the host interface 350 included in the host 300 as described in the foregoing embodiments and may perform the operations of the host 300 or the host interface 350 as described in the foregoing embodiments. On the other hand, the non-volatile storage 1500 including the flash memory may correspond to the device 400 as described in the foregoing exemplary embodiments or may include a configuration corresponding to the device interface 450 included in the device 400. The non-volatile storage 1500 may perform the operations of the device 400 or the device interface 450 as described in the foregoing embodiments.

Through the serial communication method according to the embodiments of the inventive concept, the bus interface 1400 and the non-volatile storage 1500 enter a power saving mode, thereby reducing power consumption due to serial communication. In addition, the non-volatile storage 1500 rapidly escapes from the power saving mode, thereby reducing a delay time until data starts to be transmitted and received between the bus interface 1400 and the non-volatile storage 1500.

Figure 16:
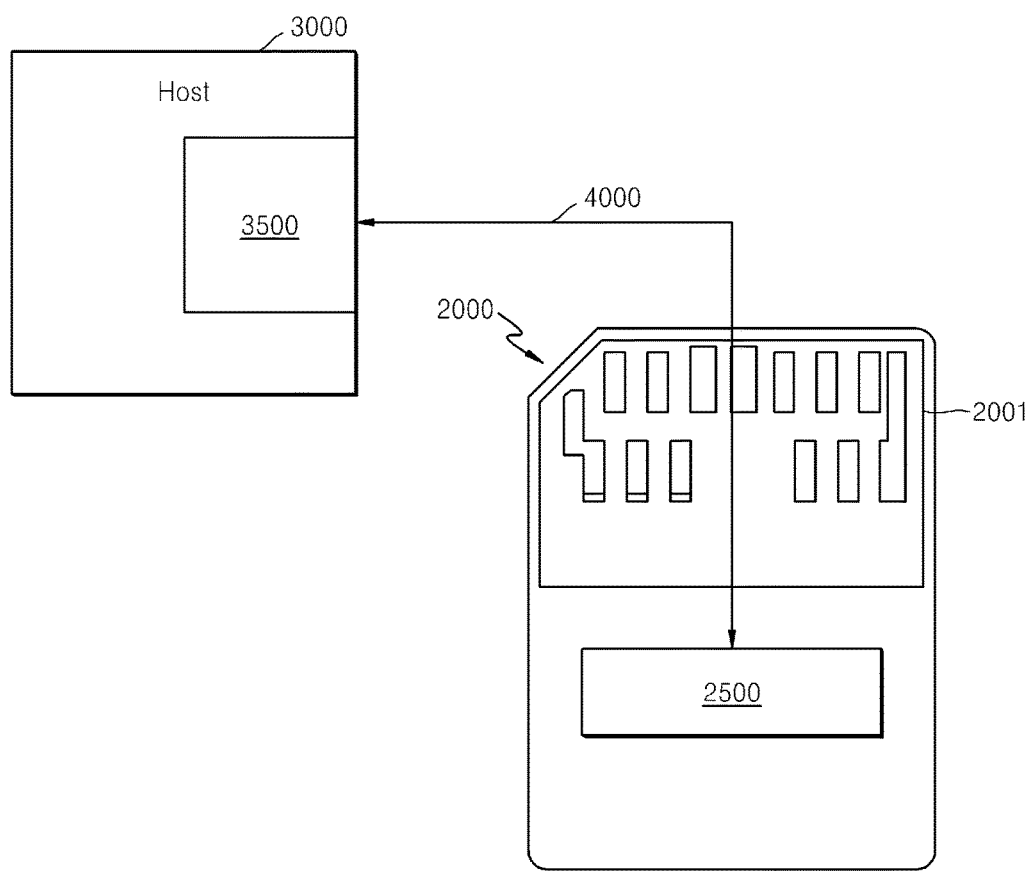
FIG. 16 is a diagram illustrating a host and a memory card using serial communication, according to an embodiment of the inventive concept.

FIG. 16 is a diagram illustrating a host 3000 and a memory card 2000 which use a serial communication method, according to an embodiment of the inventive concept. The host 3000 and the memory card 2000 may be connected to each other through a communication line 4000. A serial communication method according to any one of the embodiments of the inventive concept may be used as a serial communication method between the host 3000 and the memory card 2000.

The host 3000 may be an electronic device, such as a mobile phone or a desktop computer, or the like, on which the memory card 2000 may be mountable, and may include a host interface 3500 for serial communication with the memory card 2000. The host 3000 may correspond to the first system 100 described in the foregoing embodiments and may perform an operation of the first system 100. The host interface 3500 may correspond to the first interface 150 described in the foregoing embodiments and may perform an operation of the first interface 150.

The memory card 2000 may be a portable storage device that may be connected to the host 3000. Referring to FIG. 16, the memory card 2000 may include a port 2001 and a memory controller 2500. The memory card 2000 may be, for example, a multimedia card (MMC), an embedded multimedia card (eMMC), or a secure digital (SD) card, or the like. The memory controller 2500 may communicate with an external host through the port 2001 and control the memory card 2000. The memory controller 2500 may correspond to or include the second interface 250 or the device interface 450 as described in the foregoing embodiments.

On the other hand, when the memory card 2000 is flash memory, serial communication between the host 3000 and the memory card 2000 may comply with the UFS standard. Thus, M-PHY and UniPro may respectively be used as a physical layer and a higher layer of the physical layer. In this case, the host 3000 may correspond to the host 300 of FIG. 7, and the host interface 3500 may correspond to the host interface 350 of FIG. 7. Therefore, the host 3000 and the host interface 3500 may perform operations corresponding to the host 300 and the host interface 3500 of FIG. 7, respectively, as described in the foregoing embodiments. Also, the memory card 2000 may correspond to the device 400 as described in the foregoing embodiments. The memory controller 2500 may correspond to or include the device interface 450 as described in the foregoing embodiments.

Based on the serial communication method according to the embodiments of the inventive concept, the host interface 3500 and the memory controller 2500 enter a power saving mode, thereby reducing power consumption during serial communication. In addition, the memory controller 2500 rapidly escapes from the power saving mode, thereby reducing a delay time until data starts to be transmitted and received between the host 3000 and the memory card 2000.

While the inventive concept has been particularly shown and described with reference to embodiments thereof, it will be understood that various changes in form and detail may be made therein without departing from the spirit and scope of the following claims.

What is claimed is:

1. A serial communication method for a layered communication architecture of a first device including a first layer, a second layer that is higher than the first layer, and a third layer that is higher than the second layer, the serial communication method comprising:

transferring a first signal including a first symbol to the second layer based on a signal received at the first layer through a communication line from a second device, said transferring the first signal performed by the first layer;
informing the third layer of reception of the first signal using a related signal based on but different from the first signal, said informing performed by the second layer without sending the first symbol to the third layer;
responding to the second layer with a response based on whether there is a task to be performed, said responding performed by the third layer without sending the first symbol to the second layer;
when there is no task to be performed, transferring a signal corresponding to the first symbol through the communication line, said transferring the signal performed by the first layer;
transferring a second signal to the first layer based on the response from the third layer, said transferring the second signal performed by the second layer; and
entering a first power saving state according to the second signal, said entering the first power saving state performed by the first layer,
wherein the serial communication method is used in a universal flash storage (UFS) interface, the first layer is a mobile industry processor interface (MIPI) M-PHY layer, and the second layer is an MIPI UniPro layer,
wherein the first symbol and the signal corresponding to the first symbol are used at the first device and the second device to control power.

2. The serial communication method of claim 1, further comprising:
transferring the first symbol to the first layer before the transferring the signal corresponding to the first symbol, said transferring the first symbol performed by the second layer.

3. The serial communication method of claim 1, further comprising:
when there is no task to be performed, entering a second power saving state after responding to the second layer, said entering the second power saving state performed by the third layer; and
entering a third power saving state after transferring the second signal to the first layer, said entering the third power saving state performed by the second layer.

4. The serial communication method of claim 3, further comprising:
detecting whether the communication line transitions from a first logic level to a second logic level in the first power saving state, said detecting performed by the first layer;
when a transition is detected, escaping from the first power saving state and transferring a third signal to the second layer and the third layer, said transferring the third signal performed by the first layer; and
entering communicable states in response to the third signal, said entering the communicable states performed by the second and third layers respectively.

5. The serial communication method of claim 1, wherein the first layer includes a physical layer, the second layer includes a data link layer, and the third layer includes an application layer.

6. The serial communication method of claim 1, further comprising:
determining whether the task is to be performed by determining whether there is data to be transmitted, said determining performed by the third layer.

7. A serial communication method used in a universal flash storage (UFS) interface between a host and a device, the serial communication method comprising:
receiving at a mobile industry processor interface (MIPI) M-PHY layer of the device a signal corresponding to a first symbol through a communication line and transferring the first symbol to an MIPI UniPro layer of the device;
informing an application layer of the device of reception of the first symbol using a related signal based on but different from the first symbol, said informing performed by the MIPI UniPro layer without sending the first symbol to the application layer;
responding to the MIPI UniPro layer with a response based on whether there is a task to be performed, said responding performed by the application layer without sending the first symbol to the MIPI UniPro layer;
when there is no task to be performed, transferring the signal corresponding to the first symbol to the host through the communication line, said transferring the signal performed by the MIPI M-PHY layer;
requesting the MIPI M-PHY layer to enter a first power saving state based on the response from the application layer, said requesting performed by the MIPI UniPro layer; and
entering the first power saving state in response to the request for entry to the first power saving state, said entering performed by the MIPI M-PHY layer,
wherein the first symbol and the signal corresponding to the first symbol are used at the host and the device to control power.

8. The serial communication method of claim 7, further comprising:
transferring the first symbol to the MIPI M-PHY layer before transferring the signal corresponding to the first symbol to the host, said transferring the first symbol to the MIPI M-PHY layer performed by the MIPI UniPro layer.

9. The serial communication method of claim 7, further comprising:
when there is no task to be performed, entering a second power saving state after responding to the MIPI UniPro layer, said entering the second power saving state performed by the application layer; and
entering a third power saving state after requesting the MIPI M-PHY layer to enter the first power saving state, said entering the third power saving state performed by the MIPI UniPro layer.

10. The serial communication method of claim 9, further comprising:
detecting whether the communication line transitions from a DIF-N level to a DIF-P level, said detecting performed by the MIPI M-PHY layer;
when a transition is detected, escaping from the first power saving state and transferring a wake-up signal to the MIPI UniPro layer and the application layer, said transferring the wake-up signal performed by the MIPI M-PHY layer; and
respectively entering communicable states in response to the wakeup signal, said entering the communicable states performed by the MIPI UniPro layer and the application layer.

11. The serial communication method of claim 10, wherein the device comprises a power management unit configured to control power of the UFS interface, and the wakeup signal is transferred to the MIPI UniPro layer and the application layer through the power management unit.

12. The serial communication method of claim 7, wherein the first symbol includes two consecutive MK2 data units.

13. The serial communication method of claim 7, wherein the first power saving state includes a deep-stall state and a deep-sleep state, and
the deep-stall state and the deep-sleep state respectively transition from a high speed (HS)-burst state and a pulse width modulation (PWM)-burst state, or the deep-stall state and the deep-sleep state respectively transition to the HS-burst state and the PWM-burst state.

14. The serial communication method of claim 7, wherein the device comprises a phase locked loop (PLL) used by the MIPI M-PHY layer and one or more ports connected to the communication line, and
the serial communication method further comprises turning the PLL off and/or masking at least one of the ports in the first power saving state.

15. A serial communication method between first and second devices, comprising:
entering a communication mode to serially transmit and receive data between the first and second devices, wherein the second device comprises a first layer, a second layer that is higher than the first layer, and a third layer that is higher than the second layer;
receiving a first symbol at the first layer of the second device from the first device;
transferring the first symbol from the first layer to the second layer;
informing, by the second layer, the third layer of reception of the first symbol using a related signal based on but different from the first symbol and without sending the first symbol to the third layer;
responding to the second layer by the third layer with a response based on whether there is a task to be performed and without sending the first symbol to the second layer;
determining if data is available for transmission at the second device, responsive to receipt of the first symbol;
transmitting the first symbol from the second device to the first device upon determination that data is not available for transmission at the second device;
entering a power saving state at the second device responsive to the received first symbol, after said transmitting the first symbol to the first device;
determining at the second device whether a communication line between the first and second devices transitions from a first logic level to a second logic level; and
escaping from the power saving state at the second device upon determination of the transition,
wherein the serial communication method is used in a universal flash storage (UFS) interface, the first layer is a mobile industry processor interface (MIPI) M-PHY layer, and the second layer is an MIPI UniPro layer,
wherein the first symbol is used at the first and second devices to control power.

16. The serial communication method of claim 15, further comprising:
transmitting data from the second device to the first device upon determination that data is available for transmission at the second device.

17. The serial communication method of claim 15, wherein the first device is a host device, and the second device is a storage device.

18. The serial communication method of claim 15, wherein the communication line is a differential communication line, and wherein the first logic level is a DIF-N logic level and the second logic level is a DIF-P logic level.

19. The serial communication method of claim 15, wherein the first and second devices respectively include first and second universal flash storage (UFS) interfaces connected to the communication line.

* * * * *